May 16, 1933.  V. A. TRIER  1,909,154
VIBRATION DAMPER OF THE FRICTION TYPE
Filed Aug. 29, 1932  2 Sheets-Sheet 1
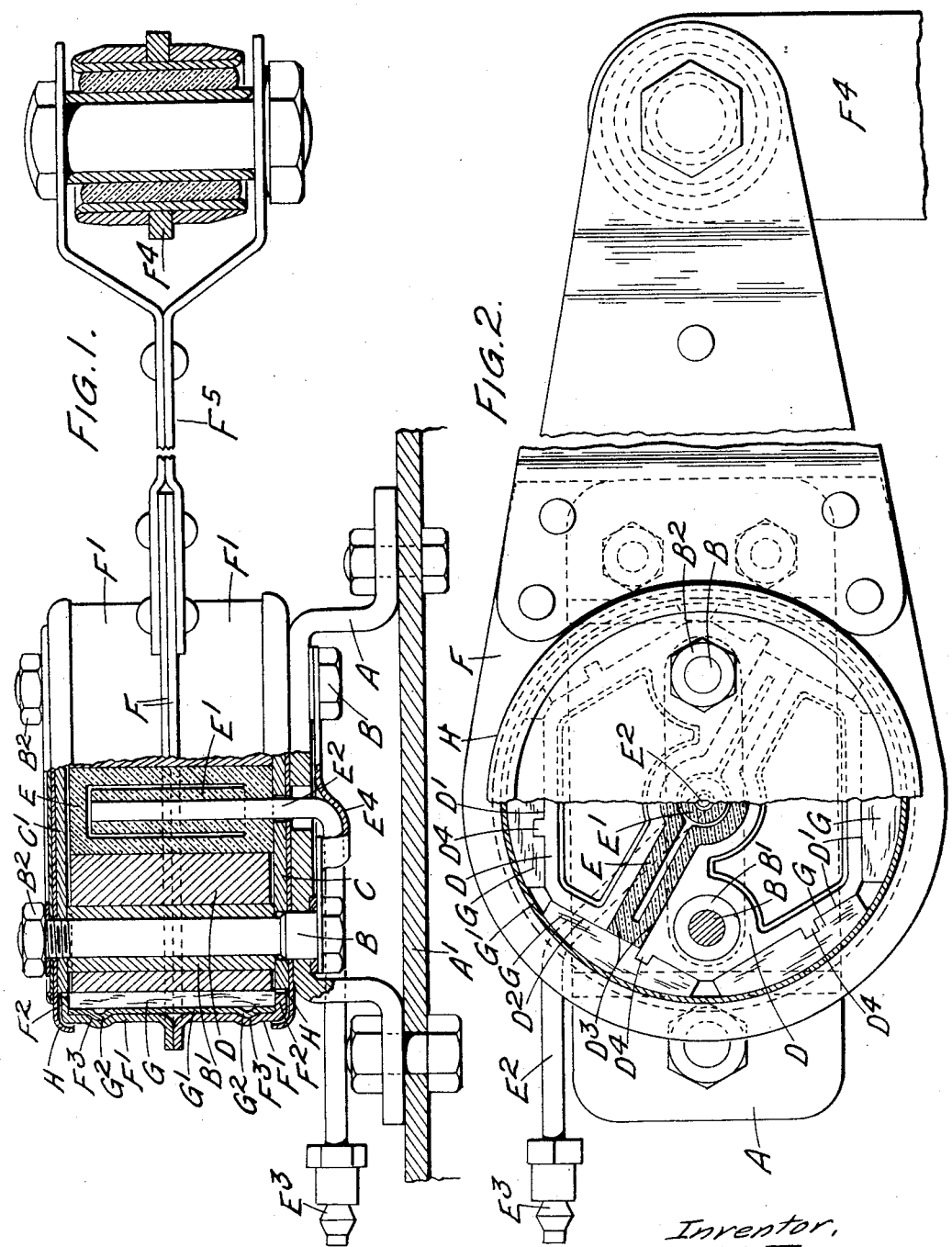
Inventor,
V. A. Trier May 16, 1933.  V. A. TRIER  1,909,154
VIBRATION DAMPER OF THE FRICTION TYPE
Filed Aug. 29, 1932  2 Sheets-Sheet 2

Inventor,
V. A. TRIER.
Per
Blair Kilcoyne, Atty.

Patented May 16, 1933

1,909,154

UNITED STATES PATENT OFFICE

VERNON ANTHONY TRIER, OF LONDON, ENGLAND

VIBRATION DAMPER OF THE FRICTION TYPE

Application filed August 29, 1932, Serial No. 630,978, and in Great Britain August 10, 1931.

This invention relates to vibration dampers of the friction type for the suspension systems of vehicles or other purposes having fluid pressure operated apparatus whereby the pressure between the cooperating friction surfaces and hence the damping effect can be varied, and has for its object to provide an improved vibration damper of this type which will be efficient and reliable in operation.

To this end a vibration damper of the friction type according to the present invention comprises a cylinder or drum, one or more friction members adapted to move towards or away from the axis of the drum so as to be pressed into frictional contact with the circumferential surface of the drum, a deformable chamber containing fluid and lying within and substantially filling a space between parts, one or each of which constitutes or acts on a friction member, and means for varying the fluid pressure within the deformable chamber. The means for applying and varying the fluid pressure may be carried by some part of the vibration damper itself but preferably are disposed at a distance from the vibration damper, for example adjacent to the driver's seat in a motor road vehicle and connected by a pipe line or the like to the deformable chamber of the vibration damper.

In one convenient arrangement the vibration damper comprises two generally segmental shaped shoes disposed within the drum with their outer surfaces bearing on or acting on a part or parts which bear on the drum while their inner faces lie adjacent and approximately parallel to one another. A deformable rubber or other chamber is disposed in and substantially fills the space between the adjacent faces of the shoes so that by varying the fluid pressure in the deformable chamber the force exerted by this chamber and tending to force the shoes apart into contact with the drum can be varied.

Figure 3:
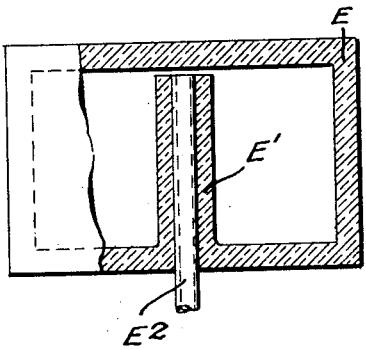
Figure 4:
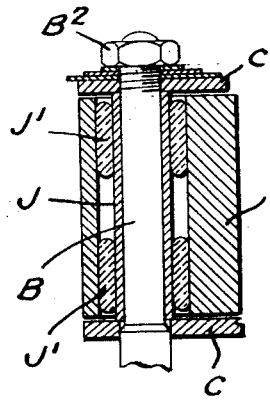
Figure 5:
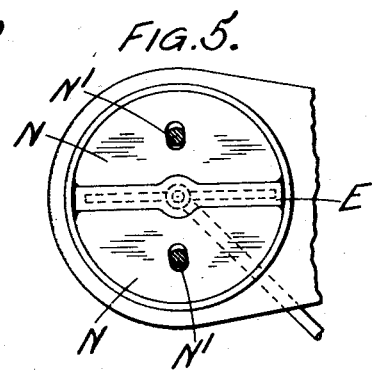
Figure 6:
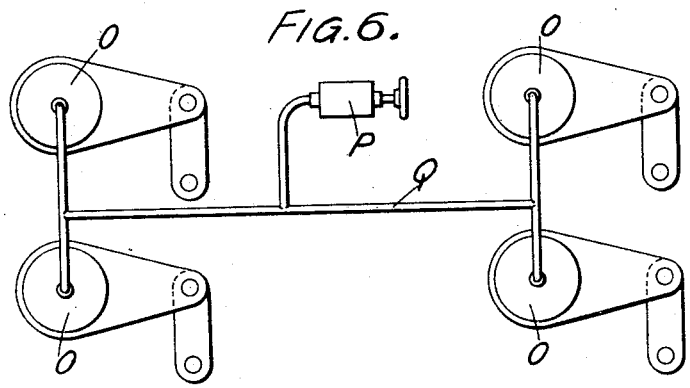

Figure 1 is a plan partly in section of one construction of vibration damper according to this invention, Figure 2 is a side elevation partly in section and partly broken away of the construction shown in Figure 1, Figure 3 is a view partly in section of an expansible chamber as employed in the vibration damper shown in Figures 1 and 2, Figure 4 shows in section a modification of a part of the construction illustrated in Figures 1 and 2, Figure 5 shows somewhat diagrammatically a further form of vibration damper according to this invention, and Figure 6 indicates one way in which the control of vibration dampers according to the present invention can be effected.

In the construction illustrated in Figures 1, 2 and 3, the vibration damper comprises a base plate A adapted to be secured to a sprung part, for example the frame $A^1$, of a vehicle. Passing through the base plate A are two bolts B each of which also passes through two side plates C, $C^1$ and through a bushing $B^1$ acting as a distance piece maintaining the two side plates at a fixed distance apart, the two side plates and the distance pieces being bolted up together and the whole being secured to the base plate by nuts $B^2$ on the ends of the bolts as shown. Pivotally mounted on each of the bushings $B^1$ is a shoe member D, each bushing passing through a part adjacent to one end of one of the shoes and these shoes being so formed with flats $D^1$, $D^2$ on their outer surfaces that the outer surfaces of the two shoes together form what is substantially a hexagon. Interposed between the inner surfaces $D^3$ of the two shoes which lie a short distance apart and approximately parallel to one another for the major portion of their area is a rubber or like flexible hollow bag or envelope E and formed integral with this envelope is an entry tube $E^1$ also formed of rubber and adapted to receive a pipe $E^2$ through which fluid under pressure can be delivered to the interior of the envelope so as to tend to force the shoes D apart. Figure 3 shows a section through the envelope at right angles to that shown in Figure 1 and each of the shoes is provided with a part-cylindrical recess in its inner face which lies adjacent to the other shoe to accommodate the part of the envelope in which the entry tube $E^1$ lies.

Surrounding the brake shoes D is a drum member comprising two metal pressings each in the form of a plate F from which is pressed out a hollow boss $F^1$ open at both ends and having an inturned flange $F^2$ at that end remote from the plate. The two plates F are then secured together as shown so that the hollow bosses together form a hollow drum surrounding the shoes D. To the plates F is secured an arm $F^5$ adapted to be connected, for example, by a link $F^4$ to the vehicle axle or other unsprung part whereby when movement of the axle takes place relatively to the sprung part of the vehicle pivotal movement of the drum about the axis of the bosses $F^1$ will be caused to take place.

The flanges $F^2$ do not extend into contact with the plates C and $C^1$ but engage the ends of blocks G of friction material interposed between the flats $D^1$, $D^2$ on the outer surface of the shoes D and a metal lining $G^1$ in the interior of the drum $F^1$, $F^1$ keys $D^4$ being formed on the flats $D^1$, $D^2$ of the shoes if desired as shown to assist in preventing movement of the friction blocks G relatively to the shoes during operation. In this construction it will be seen that movement of the drum $F^1$, $F^1$ relatively to the shoes D in a direction parallel to the axes of the pivot pins B is prevented by reason of the flanges $F^2$ engaging the sides of the friction blocks G and such movement is thus prevented without metal-to-metal contact whereby squeaking and the necessity for lubrication tends to be avoided.

As shown the pipe $E^2$ passes out through an aperture in the base plate A and is then bent at right angles and provided at its free end with a coupling $E^3$ whereby it can be connected to a source of liquid or other fluid pressure, a small cover plate $E^4$ being provided to cover the bend in the pipe as shown.

In order to prevent movement of the metal lining $G^1$ relatively to the drum $F^1$, $F^1$ small part-spherical or like recesses $F^3$ are formed in the interior of the drum and the corresponding parts of the lining G are forced into these recesses as shown at $G^2$. Further, light cover plates H are preferably provided as shown to cover the gap between the plates and the flanges $F^2$ of the drum F.

With the construction of the rubber or like expansible envelope shown having an entry tube $E^1$ formed integral with and extending into it so that pressure set up within the envelope forces this tube into contact with the part of the pipe $E^2$ within it, it will be seen that this tends effectively to seal the joint between the metal tube $E^1$ and the rubber envelope.

It will be seen that with this construction when fluid under pressure is admitted through the pipe $E^2$ to the interior of the envelope E the envelope will tend to expand and will thus force the shoes D apart about their pivots $B^1$. This will force the blocks of friction material G into engagement with the lining $G^1$ of the drum $F^1$, $F^1$ so as to tend to prevent movement of this drum and its lining relatively to the plates C and hence to the base plate A about the axis of the drum. Further, the degree to which this relative movement tends to be prevented can be varied by varying the pressure of the fluid within the envelope E, thus providing a ready means of controlling the friction between the parts of the device and hence the damping effect of this device.

Figure 4 shows a modified form of pivotal mounting for the shoes in which each shoe D, instead of being mounted directly on a bushing or sleeve $B^1$ as shown in Figures 1 and 2 is pivotally connected to a sleeve member J through compressed rubber bushings $J^1$ each rubber bushing preferably being of known type having its radial dimension so reduced by compression between the bore in the shoe D and the sleeve that it adheres to both these members but permits angular movement of the shoe relatively to the sleeve by intermolecular deformation which takes place in the rubber. In this way the necessity for lubrication of the bearing between the shoe and the sleeve is eliminated.

Figure 5 illustrates a still further modification in which the shoes N are so mounted on pivot pins $N^1$ carried by the base plate as to be capable of limited movement towards and away from one another, an expansible rubber or like envelope E of the kind employed in the construction shown in Figures 1, 2 and 3 being disposed between the two shoes so as to force them apart and into contact with the drum.

With vibration dampers according to the present invention each separate vibration damper may be provided with separate means for controlling the pressure of fluid acting to maintain the friction between the two parts of the vibration damper, such means either being mounted on the damper or separately therefrom, or the pressure of fluid delivered to two or more dampers may be controlled simultaneously by a single member. For example in the arrangement diagrammatically illustrated in Figure 6 four vibration dampers O according to the invention applied respectively to the four wheels of a vehicle are adapted to be controlled by fluid pressure derived from a single fluid pressure control device indicated at P through piping Q.

It is to be understood that the constructions more particularly described above are given by way of example only and that constructional details may be modified without departing from this invention.

What I claim as my invention and desire to secure by Letters Patent is:—

1. A vibration damper of the friction type including in combination a drum, two generally semi-circular shoes disposed within the drum with their outer surfaces adjacent to the surface of the drum while their inner faces lie adjacent and approximately parallel to one another, a deformable chamber disposed in and substantially filling the space between the adjacent faces of the shoes and containing fluid, and means for varying the pressure in the deformable chamber so as to vary the force exerted thereby on the shoes and tending to move them towards the inner circumferential surface of the drum.

2. A vibration damper of the friction type including in combination a drum, two generally segmental shaped shoes disposed within the drum the outer surfaces of the shoes being formed with flats so as to provide between them and the inner surface of the drum chambers of generally segmental form while the inner faces of the shoes lie adjacent and approximately parallel to one another, blocks of friction material disposed in the segmental chambers and each having a flat surface in contact with a flat surface on a shoe and a curved surface lying in contact with the inner circumferential surface of the drum, a deformable chamber disposed within and substantially filling the space between the adjacent faces of the shoes and containing fluid, and means for varying the fluid pressure in the deformable chamber so as to vary the force exerted by this chamber tending to force the shoes apart and hence to move the friction blocks into contact with the drum.

3. A vibration damper of the friction type including in combination a drum, two generally segmental shaped shoes disposed within the drum the outer surfaces of the shoes being formed with flats so as to provide between them and the inner surface of the drum chambers of generally segmental form and with key-like projections on these flats while the inner faces of the shoes lie adjacent and approximately parallel to one another, blocks of friction material disposed in the segmental chambers and each having a flat surface in contact with a flat surface on a shoe with a recess engaged by the key-like projection and a curved surface lying in contact with the inner circumferential surface of the drum, a deformable chamber disposed within and substantially filling the space between the adjacent faces of the shoes and containing fluid, and means for varying the fluid pressure in the deformable chamber so as to vary the force exerted by this chamber tending to force the shoes apart and hence to move the friction blocks into contact with the drum.

4. A vibration damper of the friction type including in combination a drum, side plates lying respectively within the end portions of the drum, two bushings extending between the side plates so as to act as spacing members therefor, a bolt extending through each bushing and the side plates and serving to draw and maintain together the side plates and the bushings, two generally segmental shaped shoes disposed within the drum and each pivoted on one of the bushings with their outer surfaces adjacent to the surface of the drum while their inner faces lie adjacent and approximately parallel to one another, a deformable chamber disposed in and substantially filling the space between the adjacent faces of the shoes and containing fluid, and means for varying the pressure in the deformable chamber so as to vary the force exerted thereby on the shoes and tending to move them towards the inner circumferential surface of the drum.

5. A vibration damper of the friction type including in combination a drum, side plates lying respectively within the end portions of the drum, two bushings extending between the side plates so as to act as spacing members therefor, a bolt extending through each bushing and the side plates and serving to draw and maintain together the side plates and the bushings, two generally segmental shaped shoes disposed within the drum and each pivoted on one of the bushings the outer surfaces of the shoes being formed with flats so as to provide between them and the inner surface of the drum chambers of generally segmental form while the inner faces of the shoes lies adjacent and approximately parallel to one another, blocks of friction material disposed in the segmental chambers and each having a flat surface in contact with a flat surface on a shoe and a curved surface lying in contact with the inner circumferential surface of the drum, a deformable chamber disposed within and substantially filling the space between the adjacent faces of the shoes and containing fluid, and means for varying the fluid pressure in the deformable chamber so as to vary the force exerted by this chamber tending to force the shoes apart and hence to move the friction blocks into contact with the drum.

6. A vibration damper of the friction type, including in combination a drum, side plates lying respectively within the end portions of the drum, two bushings extending between the side plates so as to act as spacing members therefor, a bolt extending through each bushing and the side plates and serving to draw and maintain together the side plate and the bushings, two generally segmental shaped shoes disposed within the drum and each pivoted on one of the bushings the outer surfaces of the shoes being formed with flats so as to provide between them and the inner surface of the drum chambers of generally segmental form and with key-like projections on these flats while the inner faces of the shoes lie adjacent and approximately parallel to one another, blocks of friction material disposed in the segmental chambers and each having a flat surface in contact with a flat surface on a shoe with a recess engaged by the key-like projection and a curved surface lying in contact with the inner circumferential surface of the drum, a deformable chamber disposed within and substantially filling the space between the adjacent faces of the shoes and containing fluid, and means for varying the fluid pressure in the deformable chamber so as to vary the force exerted by this chamber tending to force the shoes apart and hence to move the friction blocks into contact with the drum.

7. A vibration damper of the friction type, including in combination a drum, two generally segmental shaped shoes disposed within the drum with their outer surfaces adjacent to the surface of the drum while their inner faces lie adjacent and approximately parallel to one another, friction material interposed between the outer surfaces of the shoes and the inner surface of the drum, the ends of the drum being provided with shallow inturned flanges which by engagement with the friction material serve to prevent relative axial movement between the shoes and the drum, a deformable chamber disposed in and substantially filling the space between the adjacent faces of the shoes and containing fluid, and means for varying the pressure in the deformable chamber so as to vary the force exerted thereby on the shoes and tending to move them towards the inner circumferential surface of the drum.

8. A vibration damper of the friction type including in combination a drum, two generally segmental shaped shoes disposed within the drum the outer surfaces of the shoes being formed with flats so as to provide between them and the inner surface of the drum chambers of generally segmental form while the inner faces of the shoes lie adjacent and approximately parallel to one another, blocks of friction material disposed in the segmental chambers and each having a flat surface in contact with a flat surface on a shoe and a curved surface lying in contact with the inner circumferential surface of the drum, the ends of the drum being provided with shallow inturned flanges which engage the edges of the friction blocks and serve to prevent relative axial movement between the drum and the shoes, a deformable chamber disposed within and substantially filling the space between the adjacent faces of the shoes and containing fluid, and means for varying the fluid pressure in the deformable chamber so as to vary the force exerted by this chamber tending to force the shoes apart and hence to move the friction blocks into contact with the drum.

9. A vibration damper of the friction type including in combination a drum, side plates lying respectively within the end portions of the drum, two bushings extending between the side plates so as to act as spacing members therefor, a bolt extending through each bushing and the side plates and serving to draw and maintain together the side plates and the bushings, two generally segmental shaped shoes disposed within the drum and each pivoted on one of the bushings with their outer surfaces adjacent to the surface of the drum while their inner faces lie adjacent and approximately parallel to one another, friction material interposed between the outer surfaces of the shoes and the inner surface of the drum, the ends of the drum being provided with shallow inturned flanges which engage the friction material and thus prevent relative axial movement between the shoes and the drum, a deformable chamber disposed in and substantially filling the space between the adjacent faces of the shoes and containing fluid, and means for varying the pressure in the deformable chamber so as to vary the force exerted thereby on the shoes and tending to move them towards the inner circumferential surface of the drum.

10. A vibration damper of the friction type including in combination a drum, side plates lying respectively within the end portions of the drum, two bushings extending between the side plates so as to act as spacing members therefor, a bolt extending through each bushing and the side plates and serving to draw and maintain together the side plates and the bushings, two generally segmental shaped shoes disposed within the drum and each pivoted on one of the bushings the outer surfaces of the shoes being formed with flats so as to provide between them and the inner surface of the drum chambers of generally segmental form while the inner faces of the shoes lie adjacent and approximately parallel to one another, blocks of friction material disposed in the segmental chambers and each having a flat surface in contact with a flat surface on a shoe and a curved surface lying in contact with the inner circumferential surface of the drum, the ends of the drum being provided with shallow inturned flanges which engage the edges of the friction blocks and thus prevent relative axial movement between the drum and the shoes, a deformable chamber disposed within and substantially filling the space between the adjacent faces of the shoes and containing fluid, and means for varying the fluid pressure in the deformable chamber so as to vary the force exerted by this chamber tending to force the shoes apart and hence to move the friction blocks into contact with the drum.

11. A vibration damper of the friction type including in combination a drum, two generally segmental shaped shoes disposed within the drum with their outer surfaces adjacent to the surface of the drum while their inner faces lie adjacent and approximately parallel to one another, a pivot for each shoe, a deformable rubber bushing interposed between each pivot pin and the wall of the bore in the shoe through which the pivot pin passes, each rubber bushing having its radial dimension so reduced by compression that it adheres to the internal surface of the bore and to the pivot pin but permits pivotal movement of the shoe relatively to the pivot pin by reason of intermolecular deformation which takes place in the rubber, a deformable chamber disposed in and substantially filling the space between the adjacent faces of the shoes and containing fluid, and means for varying the pressure in the deformable chamber so as to vary the force exerted thereby on the shoes and tending to move them towards the inner circumferential surface of the drum.

12. A vibration damper of the friction type including in combination a drum, two generally segmental shaped shoes disposed within the drum with their outer surfaces adjacent to the surface of the drum while their inner faces lie adjacent and approximately parallel to one another, a pivot for each shoe, a deformable rubber bushing interposed between each pivot pin and the wall of the bore in the shoe through which the pivot pin passes, each rubber bushing having its radial dimension so reduced by compression that it adheres to the internal surface of the bore and to the pivot pin but permits pivotal movement of the shoe relatively to the pivot pin by reason of intermolecular deformation which takes place in the rubber, friction material interposed between the outer surfaces of the shoes and the inner surface of the drum, the ends of the drum being provided with shallow inturned flanges which by engagement with the friction material serve to prevent relative axial movement between the shoes and the drum, a deformable chamber disposed in and substantially filling the space between the adjacent faces of the shoes and containing fluid, and means for varying the pressure in the deformable chamber so as to vary the force exerted thereby on the shoes and tending to move them towards the inner circumferential surface of the drum.

13. A vibration damper of the friction type including in combination a drum, side plates lying respectively within the end portions of the drum, two bushings extending between the side plates so as to act as spacing members therefor, a bolt extending through each bushing and the side plates and serving to draw and maintain together the side plates and the bushings, two generally segmental shaped shoes disposed within the drum with a bore in each shoe through which one of the bushings passes, the outer surfaces of the shoes being formed with flats so as to provide between them and the inner surface of the drum chambers of generally segmental form while the inner faces of the shoes lie adjacent and approximately parallel to one another, a deformable rubber bushing interposed between each of the bushings and the bore in the shoe through which the bushing passes, each rubber bushing having its radial dimension so reduced by compression that it adheres to the internal surface of the bore and to the bushing but permits pivotal movement of the shoe relatively to the bushing by reason of intermolecular deformation which takes place in the rubber, blocks of friction material disposed in the segmental chambers formed between the outer surfaces of the shoes and the inner surface of the drum, each block having a flat surface in contact with a flat surface on a shoe and a curved surface lying in contact with the inner circumferential surface of the drum, the ends of the drum being provided with shallow inturned flanges which engage the edges of the friction blocks and thus prevent relative axial movement between the drum and the shoes, a deformable chamber disposed within and substantially filling the space between the adjacent faces of the shoes and containing fluid, and means for varying the fluid pressure in the deformable chamber so as to vary the force exerted by this chamber tending to force the shoes apart and hence to move the friction blocks into contact with the drum.

14. A vibration damper of the friction type including in combination a drum, two generally segmental shaped shoes disposed within the drum, the outer surfaces of the shoes being formed with flats so as to provide between them and the inner surface of the drum chambers of generally segmental form while the inner faces of the shoes lie adjacent and approximately parallel to one another, blocks of friction material disposed in the segmental chambers and each having a flat surface in contact with a flat surface on a shoe and a curved surface lying in contact with the inner circumferential surface of the drum, a deformable chamber formed of flexible material containing fluid and lying within and substantially filling the space between the shoes, a flexible entry tube formed integral with the deformable chamber and extending from the outer wall of this chamber to a point within the chamber, a delivery pipe inserted into the entry tube, and means for delivering fluid under pressure to the interior of the deformable chamber through the delivery pipe and entry tube.

15. A vibration damper of the friction type including in combination a drum, side plates lying respectively within the end portions of the drum, two bushings extending between the side plates so as to act as spacing members therefor, a bolt extending through each bushing and the side plates and serving to draw and maintain together the side plates and the bushings, two generally segmental shaped shoes disposed within the drum and each pivoted on one of the bushings the outer surfaces of the shoes being formed with flats so as to provide between them and the inner surface of the drum chambers of generally segmental form while the inner faces of the shoes lie adjacent and approximately parallel to one another, blocks of friction material disposed in the segmental chambers and each having a flat surface in contact with a flat surface on a shoe and a curved surface lying in contact with the inner circumferential surface of the drum, the ends of the drum being provided with shallow inturned flanges which engage the edges of the friction blocks and thus prevent relative axial movement between the drum and the shoes, a deformable chamber formed of flexible material containing fluid and lying within and substantially filling the space between the shoes, a flexible entry tube formed integral with the deformable chamber and extending from the outer wall of this chamber to a point within the chamber, a delivery pipe inserted into the entry tube, and means for delivering fluid under pressure to the interior of the deformable chamber through the delivery pipe and entry tube.

In testimony whereof I have signed my name to this specification.

VERNON ANTHONY TRIER.